United States Patent
Hsieh et al.

(10) Patent No.: US 7,250,324 B2
(45) Date of Patent: Jul. 31, 2007

(54) METHOD FOR MANUFACTURING AN IMAGE SENSOR

(75) Inventors: Jackson Hsieh, Hsinchu Hsien (TW); Jichen Wu, Hsinchu Hsien (TW)

(73) Assignee: Kingpak Technology Inc., Hsinchu Hsien (TW)

( * ) Notice: Subject to any disclaimer, the term of this patent is extended or adjusted under 35 U.S.C. 154(b) by 836 days.

(21) Appl. No.: 10/386,067

(22) Filed: Mar. 10, 2003

(65) Prior Publication Data

US 2004/0179126 A1 Sep. 16, 2004

(51) Int. Cl.
*H01L 21/00* (2006.01)
(52) U.S. Cl. ............... 438/64; 438/115; 438/116; 438/118; 438/123
(58) Field of Classification Search ............... 438/64, 438/106, 115, 116, 118, 123
See application file for complete search history.

(56) References Cited

U.S. PATENT DOCUMENTS 5,714,222 A * 2/1998 Yokoyama ............... 428/64.1
6,403,881 B1 * 6/2002 Hughes ..................... 174/559
6,753,203 B1 * 6/2004 Dai ........................... 438/106
6,841,412 B1 * 1/2005 Fisher et al. ............... 438/106

* cited by examiner

*Primary Examiner*—M. Wilczewski
*Assistant Examiner*—Toniae M. Thomas
(74) *Attorney, Agent, or Firm*—Pro-Techtor Int'l Services

(57) ABSTRACT

A method for manufacturing an image sensor includes the steps of: providing a substrate having an upper surface and a lower surface; mounting a frame layer on the upper surface of the substrate to form a cavity together with the substrate; mounting a photosensitive chip, which is formed with a plurality of bonding pads, to the upper surface of the substrate, the photosensitive chip being located within the cavity; providing a plurality of wires to electrically connect the bonding pads of the photosensitive chip to the substrate; supplying an adhesive medium to the cavity; placing a transparent layer on the frame layer to cover the photosensitive chip so as to form the image sensor; and rotating the image sensor to make the adhesive medium be uniformly distributed over the upper surface of the substrate so that particles within the cavity are adhered to the adhesive medium.

6 Claims, 1 Drawing Sheet

METHOD FOR MANUFACTURING AN IMAGE SENSOR

BACKGROUND OF THE INVENTION

1. Field of the Invention

The invention relates to a method for manufacturing an image sensor, and in particular to a method for effectively removing particles and improving the sensor effects.

2. Description of the Related Art

A general sensor is used to sense signals, which may be optical or audio signals. The sensor of the invention is used to receive image signals or optical signals. After receiving the image signals, the sensor converts the image signals into electrical signals, which are then transmitted to a printed circuit board via a substrate.

Referring to FIG. 1, a conventional image sensor includes a substrate 10, a frame layer 18, a photosensitive chip 26, a plurality of wires 28, and a transparent layer 34. The substrate 10 has an upper surface 12 on which first terminals 15 are formed, and a lower surface 14 on which second terminals 16 are formed. The frame layer 18 has a first surface 20 and a second surface 22 adhered to the upper surface 12 of the substrate 10 to form a cavity 24 together with the substrate 10. The photosensitive chip 26 is arranged within the cavity 24 and is mounted to the upper surface 12 of the substrate 10. Each wire 28 has a first terminal 30 and a second terminal 32. The first terminals 30 are electrically connected to the photosensitive chip 26, and the second terminals 32 are electrically connected to the first terminals 15 of the substrate 10. The transparent layer 34 is adhered to the first surface 20 of the frame layer 18.

However, the image sensor has to be manufactured in a clean room in order to prevent particles from entering the cavity 24, to prevent electrostatic charges from adhering to the transparent layer 34 and the photosensitive chip 26, and to increase the number of good pixels. Even if the image sensor is manufactured in a clean room, a few particles may enter the cavity 24 to influence the quality of the pixels of the image sensor. Thus, the manufacturers have to spend a lot of money to heighten the level of the clean room so as to prevent any particles from entering the image sensor.

SUMMARY OF THE INVENTION

An object of the invention is to provide a method for manufacturing an image sensor to prevent particles in the image sensor from influencing the sensor effects and to improve the sensor quality.

To achieve the above-mentioned object, the invention provides a method for manufacturing an image sensor. The method includes the steps of: providing a substrate having an upper surface and a lower surface; mounting a frame layer on the upper surface of the substrate to form a cavity together with the substrate; mounting a photosensitive chip, which is formed with a plurality of bonding pads, to the upper surface of the substrate, the photosensitive chip being located within the cavity; providing a plurality of wires to electrically connect the bonding pads of the photosensitive chip to the substrate; supplying an adhesive medium to the cavity; placing a transparent layer on the frame layer to cover the photosensitive chip so as to form the image sensor; and rotating the image sensor to make the adhesive medium be uniformly distributed over the upper surface of the substrate so that only a portion of each of the wires is encapsulated by the adhesive medium, the other portion of each of the wires and the bonding pads are exposed, and particles within the cavity are adhered to the adhesive medium.

DETAILED DESCRIPTION OF THE INVENTION

Figure 1:
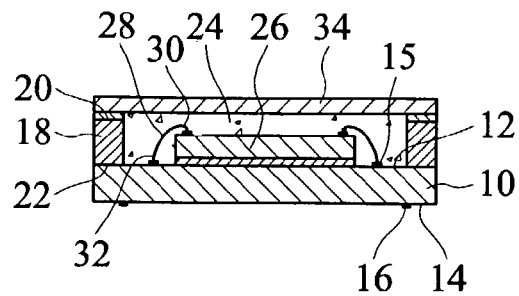
FIG. 1 shows a conventional image sensor.
Figure 2:
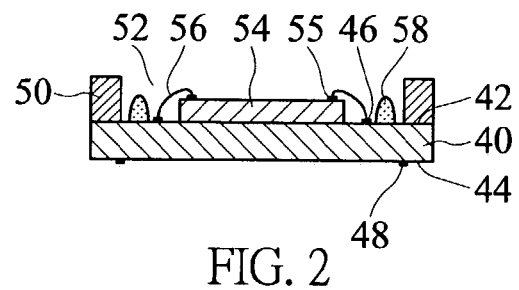
FIG. 2 is a first schematic illustration showing a method for manufacturing an image sensor according to a first embodiment of the invention.

Referring to FIG. 2, a method for manufacturing an image sensor according to a first embodiment of the invention includes the following steps.

In a first step, a substrate 40 having an upper surface 42 and a lower surface 44 is provided. The upper surface 42 is formed with a plurality of first connection points 46, and the lower surface 44 is formed with a plurality of second connection points 48.

In a second step, a frame layer 50 is mounted to the upper surface 42 of the substrate 40 to form a cavity 52 together with the substrate 40.

In a third step, a photosensitive chip 54 formed with a plurality of bonding pads 55 is mounted to the upper surface 42 of the substrate 40 and located within the cavity 52.

In a fourth step, a plurality of wires 56 is provided to electrically connect the bonding pads 55 of the photosensitive chip 54 to the first connection points 46 of the substrate 40, respectively. Then, signals from the photosensitive chip 54 may be transferred to the substrate 40.

In a fifth step, an adhesive medium 58, which may be glue in this embodiment, is coated or sprayed into the cavity 52. In this step, the adhesive medium 58 is supplied to a location on the upper surface 42 of the substrate 40 between the frame layer 50 and the wires 56.

Figure 3:
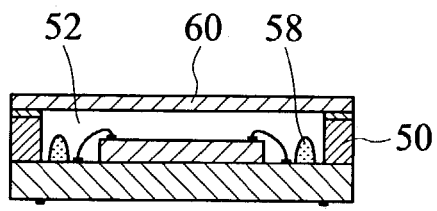
FIG. 3 is a second schematic illustration showing the method for manufacturing the image sensor according to the first embodiment of the invention.

In a sixth step, as shown in FIG. 3, a transparent layer 60 is placed on the frame layer 50 to cover the photosensitive chip 54. Then, the image sensor is completely formed.

Figure 4:
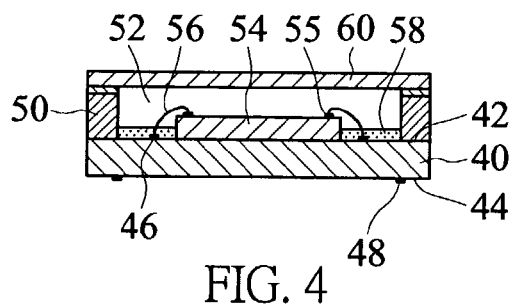
FIG. 4 is a third schematic illustration showing the method for manufacturing the image sensor according to the first embodiment of the invention.

In a seventh step, as shown in FIG. 4, the image sensor is rotated so that the adhesive medium 58 may be uniformly distributed over the upper surface 42 of the substrate 40. In addition, the particles within the cavity 52 and the particles electrostatically adhered to the photosensitive chip 54 and the transparent layer 60 may fall to the adhesive medium 58 and be adhered by the adhesive medium 58. As shown in FIG. 4, only a portion of each of the wires 56 is encapsulated by the adhesive medium 58, and the other portion of each of the wires 56 and the bonding pads 55 of the photosensitive chip 54 are exposed. In addition, the adhesive medium 58, which is uniformly distributed over the upper surface 42 of the substrate 40, is lower than the photosensitive chip 54.

A method for manufacturing an image sensor according to a second embodiment of the invention includes the following steps.

In a first step, a substrate 40 having an upper surface 42 and a lower surface 44 is provided. The upper surface 42 is formed with a plurality of first connection points 46, and the lower surface 44 is formed with a plurality of second connection points 48.

In a second step, a frame layer 50 is mounted to the upper surface 42 of the substrate 40 to form a cavity 52 together with the substrate 40.

In a third step, a photosensitive chip 54 formed with a plurality of bonding pads 55 is mounted to the upper surface 42 of the substrate 40 and located within the cavity 52.

In a fourth step, a plurality of wires 56 is provided to electrically connect the bonding pads 55 of the photosensitive chip 54 to the first connection points 46 of the substrate 40, receptively. Then, signals from the photosensitive chip 54 may be transferred to the substrate 40.

In a fifth step, an adhesive medium 58, which may be glue in this embodiment, is coated into the cavity 52.

Figure 5:
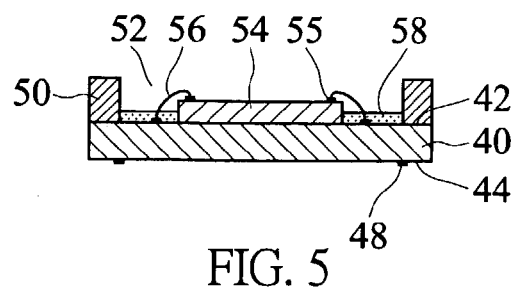
FIG. 5 is a schematic illustration showing a method for manufacturing an image sensor according to a second embodiment of the invention.

In a sixth step, as shown in FIG. 5, the substrate is rotated so that the adhesive medium 58 may be uniformly distributed over the upper surface 42 of the substrate 40.

In a seventh step, as shown in FIG. 4, a transparent layer 60 is placed on the frame layer 50 to cover the photosensitive chip 54.

In an eighth step, the image sensor is rotated so that the particles within the cavity 52 and the particles electrostatically adhered to the photosensitive chip 54 and the transparent layer 60 may fall to the adhesive medium 58 and be adhered by the adhesive medium 58.

Consequently, the adhesive medium 58 may adhere the particles within the cavity 52 to improve the sensor quality of the image sensor. In addition, the particles electrostatically adhered to the photosensitive chip 54 and the transparent layer 60 may fall to the adhesive medium 58 by way of rotation so that the sensor quality of the image sensor may be further improved.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A method for manufacturing an image sensor, the method comprising the steps of:
    providing a substrate having an upper surface and a lower surface;
    mounting a frame layer on the upper surface of the substrate to form a cavity together with the substrate;
    mounting a photosensitive chip, which is formed with a plurality of bonding pads, to the upper surface of the substrate, the photosensitive chip being located within the cavity;
    providing a plurality of wires to electrically connect the bonding pads of the photosensitive chip to the substrate;
    supplying an adhesive medium to the cavity;
    placing a transparent layer on the frame layer to cover the photosensitive chip so as to form the image sensor; and
    rotating the image sensor to make the adhesive medium be uniformly distributed over the upper surface of the substrate so that only a portion of each of the wires is encapsulated by the adhesive medium, the other portion of each of the wires and the bonding pads of the photosensitive chip are exposed, and particles within the cavity are adhered to the adhesive medium.

2. The method according to claim 1, wherein the upper surface of the substrate is formed with a plurality of first connection points, and the plurality of wires electrically connects the bonding pads of the photosensitive chip to the first connection points, respectively.

3. The method according to claim 1, further comprising a step for rotating the substrate after the adhesive medium is supplied to the cavity.

4. The method according to claim 1, wherein the adhesive medium is supplied to the cavity by way of coating or spraying.

5. The method according to claim 1, wherein the adhesive medium, which is uniformly distributed over the upper surface of the substrate, is lower than the photosensitive chip.

6. The method according to claim 1, wherein the adhesive medium is supplied to a location on the upper surface of the substrate between the frame layer and the wires in the step of supplying the adhesive medium to the cavity.

* * * * *